United States Patent
Brown et al.

(10) Patent No.: US 7,216,478 B2
(45) Date of Patent: May 15, 2007

(54) EXHAUST TREATMENT DIAGNOSTIC USING A TEMPERATURE SENSOR

(75) Inventors: David B. Brown, Brighton, MI (US); Michael J. Paratore, Jr., Howell, MI (US); Michael B. Viola, Macomb Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/145,278

(22) Filed: Jun. 3, 2005

(65) Prior Publication Data

US 2006/0272317 A1 Dec. 7, 2006

(51) Int. Cl.
*F01N 3/00* (2006.01)

(52) U.S. Cl. .............................. 60/277; 60/274; 60/276; 60/286

(58) Field of Classification Search ................. 60/274, 60/276, 277, 286, 295, 303
See application file for complete search history.

(56) References Cited

U.S. PATENT DOCUMENTS

| | | | | |
|---|---|---|---|---|
| 5,706,652 A | * | 1/1998 | Sultan | 60/274 |
| 5,842,341 A | * | 12/1998 | Kibe | 60/274 |
| 5,950,422 A | * | 9/1999 | Dolling | 60/274 |
| 6,134,883 A | * | 10/2000 | Kato et al. | 60/274 |
| 6,487,852 B1 | * | 12/2002 | Murphy et al. | 60/286 |
| 6,983,589 B2 | * | 1/2006 | Lewis et al. | 60/277 |
| 6,990,800 B2 | * | 1/2006 | van Nieuwstadt et al. | 60/277 |

* cited by examiner

*Primary Examiner*—Thomas Denion
*Assistant Examiner*—Diem Tran
(74) *Attorney, Agent, or Firm*—Christopher DeVries

(57) ABSTRACT

A method of monitoring operation of a dosing system for treating exhaust of an engine includes monitoring a downstream temperature of an exhaust downstream of the dosing system and injecting a dosing agent. A control module determines a temperature differential threshold based on an amount of dosing agent injected and calculates a temperature differential. The control module further evaluates operation of the dosing system based on the temperature differential and the temperature differential threshold.

15 Claims, 5 Drawing Sheets

EXHAUST TREATMENT DIAGNOSTIC USING A TEMPERATURE SENSOR

FIELD OF THE INVENTION

The present invention relates to vehicle exhaust systems, and more particularly to treating exhaust of an engine.

BACKGROUND OF THE INVENTION

Engine operation includes a combustion process and an exhaust process. During the combustion process, an air/fuel mixture is combusted within cylinders to drive pistons (not shown). A vehicle engine produces exhaust as a result from the combustion of air and fuel. During the exhaust process, exhaust is released from the cylinders into the exhaust system. The exhaust contains Nitrous Oxide (NOx) and Carbon Monoxide (CO) that is treated before the exhaust is released from the vehicle.

An exhaust treatment system is used to reduce the amount of emissions (e.g., NOx) in the exhaust. A control module monitors engine operation and emissions levels and a dosing system injects a reducing agent into the exhaust upstream from a catalyst. The treated exhaust reacts with the catalyst and a chemical reaction occurs that reduces the level of emissions.

The dosing system includes a dosing agent supply and an injector. The dosing agent must be delivered in a proper amount corresponding to the level of emissions in order to effectively treat the exhaust. A faulty injector or an insufficient dosing agent supply would result in an inadequate amount of dosing agent to properly treat the exhaust. Therefore, it is desirable to monitor the dosing system and determine whether it is operating correctly.

SUMMARY OF THE INVENTION

Accordingly, the present invention provides an exhaust treatment system for treating exhaust exiting an engine. The exhaust treatment system includes a downstream sensor that monitors a downstream temperature of the exhaust and a dosing system that selectively injects a dosing agent into the exhaust. A control module determines a temperature differential threshold based on an amount of the dosing agent and calculates a temperature differential of the exhaust based on the downstream temperature. The control module further evaluates operation of the dosing system based on the temperature differential and the temperature differential threshold.

In one feature, the exhaust treatment system further includes a NOx sensor that monitors a NOx level of the exhaust, wherein the amount of dosing agent injected into the exhaust is determined based on the NOx level.

In another feature, the control module determines whether the engine is operating in steady-state. A pre-determined amount of dosing agent is injected when the engine is operating in a steady-state.

In another feature, the temperature differential threshold is a threshold range defined by an upper temperature differential and a lower temperature differential.

In still other features, the control module indicates a PASS status of the dosing system when the temperature differential is within the threshold range and indicates a FAIL status of the dosing system when the temperature differential is outside the threshold range. The temperature differential is determined based on the downstream temperature.

In yet another feature, an upstream temperature sensor monitors an upstream temperature of the exhaust upstream of the dosing system.

In still another feature, the temperature differential is determined based on the upstream temperature and the downstream temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
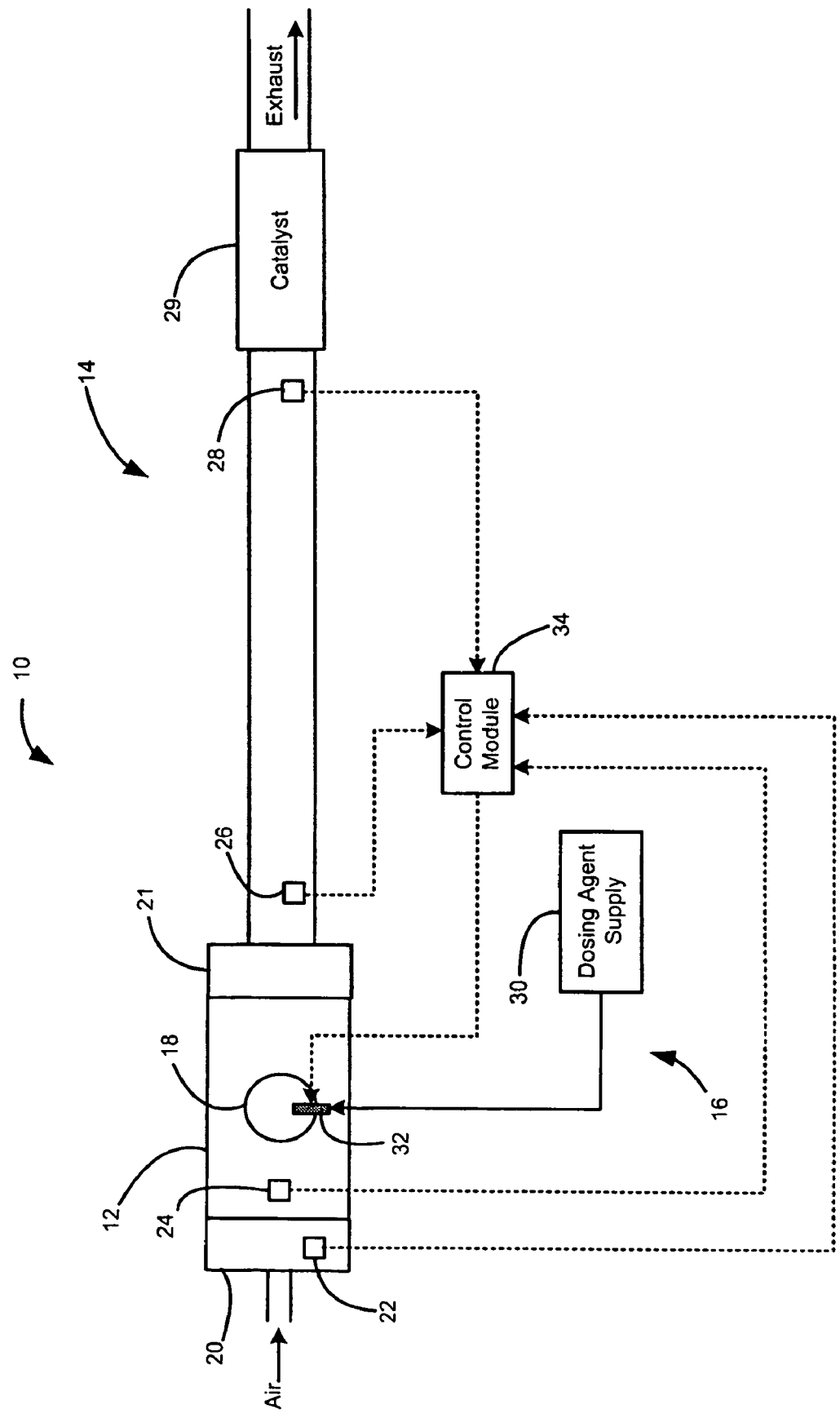
FIG. 1 is a functional block diagram of an engine system including a dosing system that injects a dosing agent into the exhaust prior to exiting a cylinder of the engine according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an engine system 10 is schematically illustrated. The engine system 10 includes an engine 12, an exhaust system 14 and a dosing system 16. The engine 12 includes a cylinder 18, an intake manifold 20, a manifold absolute pressure (MAP) sensor 22 and an engine speed sensor 24. Air flows into the engine 12 through the intake manifold 20 and is combusted with fuel in the cylinder 18 to drive pistons (not shown). Although a single cylinder 18 is illustrated, it is appreciated that the engine 12 may include additional cylinders 18. For example, engines having 2, 3, 4, 5, 6, 8, 10, 12 and 16 cylinders are anticipated.

Exhaust is produced inside the cylinder 18 as a result of the combustion process. The exhaust system 14 provides a path to atmosphere and through which the exhaust is treated before being released to the atmosphere. The exhaust system 14 includes an exhaust manifold and a catalyst 29. The exhaust manifold directs exhaust exiting the cylinder towards the catalyst 29. The exhaust is treated within the catalyst to reduce the emissions thereof.

A temperature sensor 26 is located downstream of the cylinder 18 and an exhaust sensor 28 is located upstream of the catalyst 29. The temperature sensor 26 is responsive to the temperature of the exhaust exiting the engine 12 and generates a temperature signal based thereon. The exhaust sensor 28 is responsive to an emissions level (e.g., a NOx level) of the exhaust and generates an emissions signal based thereon.

The dosing system 16 includes a dosing agent supply 30 and a dosing injector 32. The dosing system 16 selectively injects a dosing agent into the exhaust. The dosing agent mixes with the exhaust and further reduces the emissions level when the exhaust/dosing agent mixture is exposed to the catalyst 29. In the arrangement of FIG. 1, the dosing injector 32 is provided as a fuel injector and the dosing agent is provided as fuel. More specifically, the dosing injector 32 selectively injects an amount of dosing agent into the exhaust within the cylinder 18, subsequent to the combustion process. The exhaust/dosing agent mixture is exhausted from the cylinder and through the exhaust system 14.

A control module 34 regulates operation of the engine system 10 and monitors operation of the dosing system 16 according to the present invention. The control module 34 receives the temperature signal from the temperature sensor 26 and the emissions (e.g., NOx) signal from the exhaust sensor 28. The control module 34 determines an amount of dosing agent to inject into the exhaust and monitors a change in exhaust temperature based on the temperature signal. The control module 34 monitors operation of the dosing system 16 based on the amount of dosing agent injected and the change in exhaust temperature, as described in further detail below.

Figure 2:
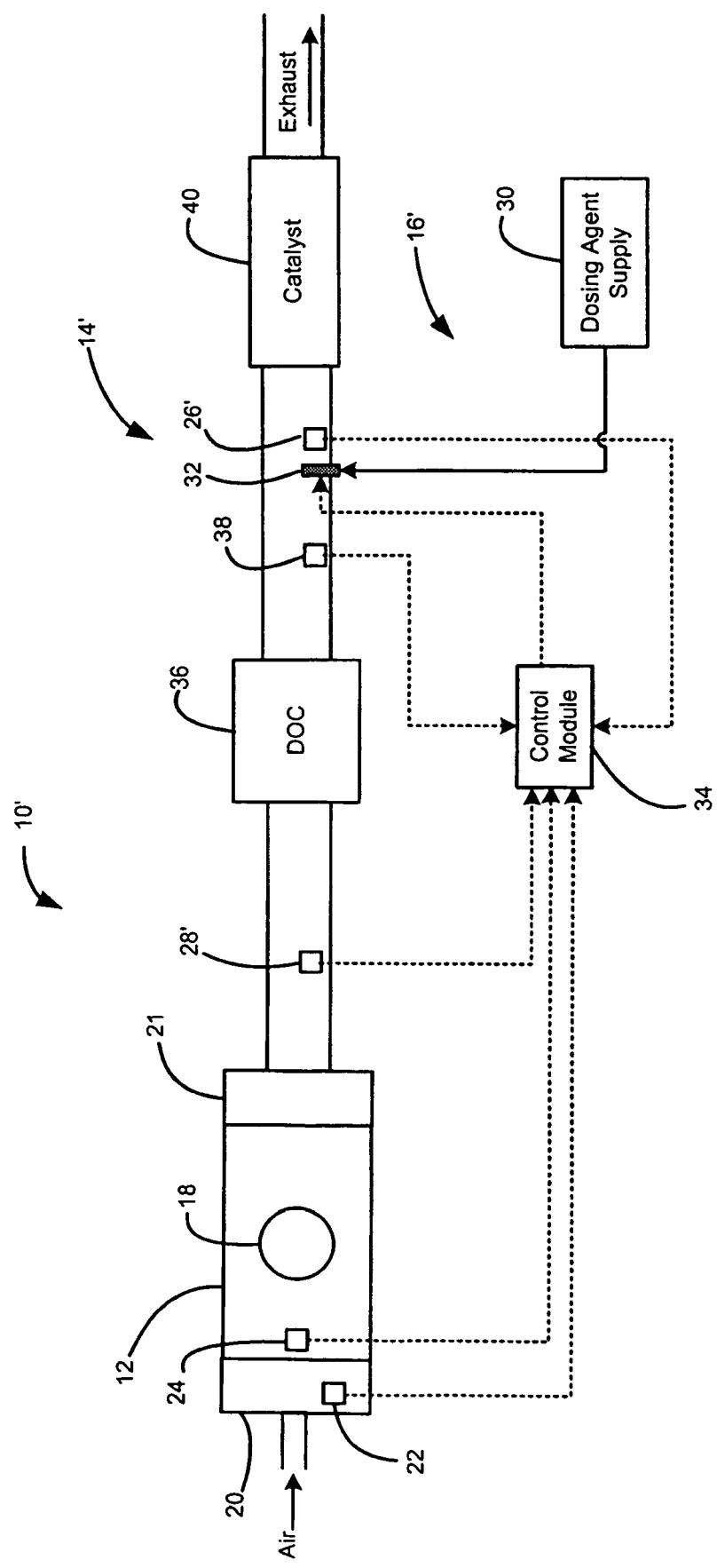
FIG. 2 is a functional block diagram of an alternative engine system including a dosing system that injects a dosing agent into the exhaust prior to reaching a catalyst according to the present invention.

Referring now to FIG. 2, an alternative engine system 10' is schematically illustrated. The engine system 10' is similar to the engine system 10 described in detail above. Therefore, like reference numerals will be used to indicate like components. The engine system 10' includes the engine 12, an exhaust system 14' and a dosing system 16'.

The exhaust system 14' includes a diesel oxidation catalyst (DOC) 36, an upstream temperature sensor 38, a downstream temperature sensor 26' and an emissions sensor 28'. The exhaust system 14' further includes a catalyst 40, that is preferably provided as a selective reducing catalyst (SCR). The DOC 36 reacts with the exhaust to reduce emission levels of the exhaust. The upstream temperature sensor 38 monitors the temperature of the exhaust prior to injection of the dosing agent, as discussed further below. The downstream temperature sensor 26' is located downstream from the dosing system 16', preferably within a spray plume provided by the dosing system 16'. The downstream temperature sensor 26' monitors the temperature of the exhaust after injection of the dosing agent, as discussed further below. The exhaust sensor 28' is responsive to an emissions (e.g., NOx) level of the exhaust. Although the exhaust treatment system 10' is illustrated as including an upstream temperature sensor 38 and a downstream temperature sensor 26', it is appreciated that the exhaust treatment diagnostic of the present invention can be executed using only the downstream temperature sensor 26', as discussed in further detail below.

The dosing system 16' includes a dosing agent supply 30' and an injector 32'. The dosing system 16' selectively injects a dosing agent into the exhaust. The dosing agent mixes with the exhaust to further reduce emissions when the exhaust/dosing agent mixture is exposed to the catalyst 40. In the arrangement of FIG. 2, the dosing agent is preferably urea that is mixed with the exhaust and treated in the catalyst 40.

A control module 34 regulates operation of the engine system 10' and monitors operation of the dosing system 16' according to the present invention. The control module 34 receives temperature signals from the temperature sensors 26',38 and the emissions (e.g., NOx) signal from the exhaust sensor 28'. In the case where a single temperature sensor is used, the control module 34 receives the temperature signal from the temperature sensor 26'. The control module 34 determines an amount of dosing agent to inject into the exhaust and monitors a change in exhaust temperature based on the temperature signal. The control module 34 monitors operation of the dosing system 16' based on the amount of dosing agent injected and the change in exhaust temperature, as described in further detail below.

Figure 3:
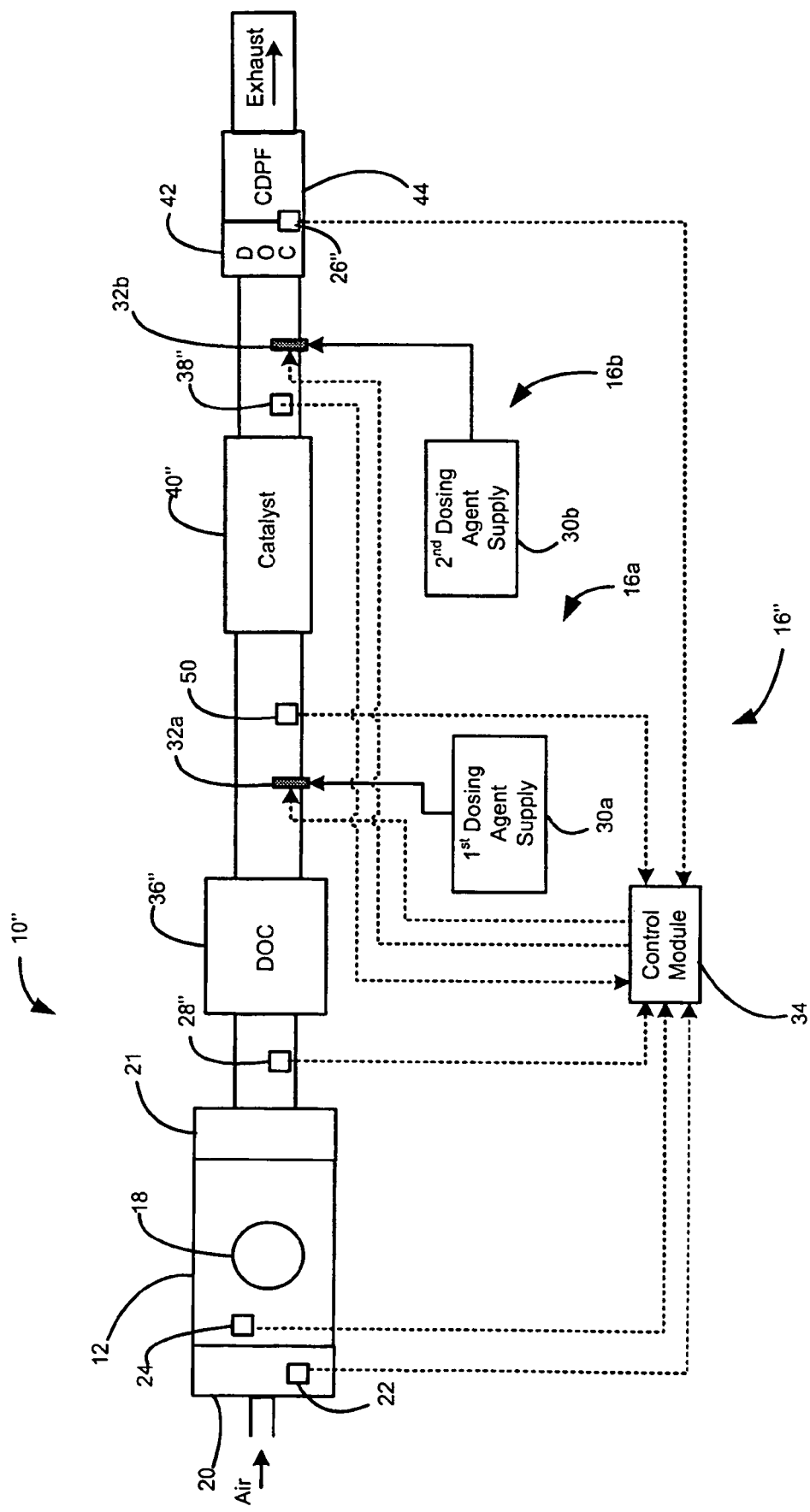
FIG. 3 is a functional block diagram of another alternative engine system including a dosing system that injects a dosing agent into the exhaust prior to reaching a second catalyst according to the present invention.

Referring now to FIG. 3, another alternative arrangement of an exhaust treatment system 10" is schematically illustrated. The exhaust treatment system 10" includes an engine 12, an exhaust system 14 and a dosing system 16".

The exhaust system 14" includes a first catalyst 36" and a second catalyst 42, preferably provided as diesel oxidation catalysts (DOC) and a catalyzed diesel particulate filter (CDPF) 44. The CDPF 44 traps exhaust soot before the exhaust reaches atmosphere. The CDPF 44 is selectively regenerated whereby the soot is burned off to clear the CDPF 44. The exhaust system 14 further includes a catalyst 40", preferably provided as a selective reducing catalyst (SCR). The first catalyst 36" and the second catalyst 42 react with the exhaust to reduce emission levels. An exhaust sensor 28" is responsive to an emissions (e.g., NOx) level of the exhaust prior to entering the catalyst 40".

The dosing system 16" includes a first dosing sub-system 16a and a second dosing sub-system 16b. The first dosing sub-system 16a includes a first dosing agent supply 30a and a dosing injector 32a. The second dosing sub-system 16b includes a dosing agent supply 30b, an injector 32b. The first dosing sub-system 16a selectively injects a dosing agent (e.g., urea) into the exhaust. The second dosing sub-system 16b selectively injects a dosing agent (e.g., fuel) into the exhaust to regenerate the CDPF 44.

A temperature sensor 50 is located downstream of the dosing injector 32a, preferably within the spray plume provided by the dosing injector 32a. A temperature sensor 38" monitors the temperature of the exhaust upstream of the dosing injector 32b. A temperature sensor 26" monitors the temperature of the exhaust downstream of the dosing injector 32b and is preferably located within the spray plume provided by the dosing injector 32b. Furthermore, the temperature sensor 26" monitors the temperature change that results from the combustion of the dosing agent over the DOC. Although a single temperature sensor 50 is associated with the first dosing sub-system 16a, it is appreciated that another temperature sensor can be implemented upstream of the dosing injector 32a. Similarly, although multiple temperature sensors 26",38" are associated with the second dosing sub-system 16b, it is anticipated that a single downstream temperature sensor 26" may be utilized.

The control module 34 regulates operation of the engine system 10" and monitors operation of the dosing system 16" according to the present invention. The control module 34 receives temperature signals from the temperature sensors 26",38",50 and the emissions (e.g., NOx) signal from the exhaust sensor 28". In the case where a single temperature sensors are used, the control module 34 receives the temperature signal from the temperature sensors 26'',50 The control module 34 determines an amount of dosing agent to inject into the exhaust for each of the dosing sub-systems 16a, 16b. The control module 34 monitors changes in exhaust temperatures based on the temperature signals. The control module 34 monitors operation of the dosing system 16' based on the amount of dosing agent injected at each dosing sub-system 16a, 16b and the changes in exhaust temperatures, as described in further detail below.

The exhaust treatment diagnostic of the present invention determines whether the dosing system 16,16',16a,16b is operating properly based on an exhaust temperature preceding injection of the dosing agent ($T_{PRE}$), an exhaust temperature after injection of the dosing agent ($T_{POST}$) and an amount of dosing agent injected ($V_{DA}$). It is anticipated that $T_{PRE}$ can be determined by a temperature sensor disposed upstream of the dosing injector or by a temperature disposed downstream of the dosing injector prior to injection of the dosing agent. $T_{POST}$ is determined by a temperature sensor disposed downstream of the dosing injector. In one mode, the control module 34 determines $V_{DA}$ based on the emissions level of the exhaust. In another mode, the control module 34 determines $V_{DA}$ based on a diagnostic routine, as discussed in further detail below. The control module 34 determines a temperature differential threshold range ($\Delta T_{THR}$) based on $V_{DA}$. $\Delta T_{THR}$ is defined by a minimum $\Delta T$ and a maximum $\Delta T$. The control module 34 further calculates a temperature differential ($\Delta T$) of the exhaust based on $T_{PRE}$ and $T_{POST}$.

The control module 34 evaluates the performance of the dosing system based on $\Delta T$ and $\Delta T_{THR}$. More specifically, the control module 34 indicates a PASS status when $\Delta T$ is within $\Delta T_{THR}$ indicates a FAIL status when $\Delta T$ is outside of $\Delta T_{THR}$. The control module 34 ultimately determines whether the dosing system 16 is faulty based on a number of FAIL indications.

In a first or non-intrusive mode, the dosing system 16,16', 16a,16b injects the dosing agent during normal engine operation. More specifically, the control module 34 monitors the emissions level based on the emissions sensor signal and determines $V_{DA}$ based on the emissions level. The control module 34 determines $T_{PRE}$ prior to injecting the dosing agent and determines $T_{POST}$ after injecting the dosing agent. $\Delta T$ is determined based on $T_{PRE}$ and $T_{POST}$ and is compared to $\Delta T_{THR}$ to determine the PASS/FAIL status.

In a second or intrusive mode, the control module 34 determines whether the engine 12 is operating at steady-state based on the MAP signal and the engine speed signal. The control module 34 determines $V_{DA}$ based on a diagnostic protocol. For example, during a first diagnostic sequence, $V_{DA}$ can be determined at a first value. During a subsequent diagnostic sequence, $V_{DA}$ can be determined at a second value that is different than the first value. In this manner, the exhaust treatment diagnostic monitors dosing system performance based on different values of $V_{DA}$. Prior to injecting the dosing agent, the control module 34 determines $T_{PRE}$ based on a signal from either a downstream temperature sensor or an upstream temperature sensor, as discussed above. After injecting the dosing agent, the control module 34 determines $T_{POST}$ based on a signal from the downstream temperature sensor.

Figure 4:
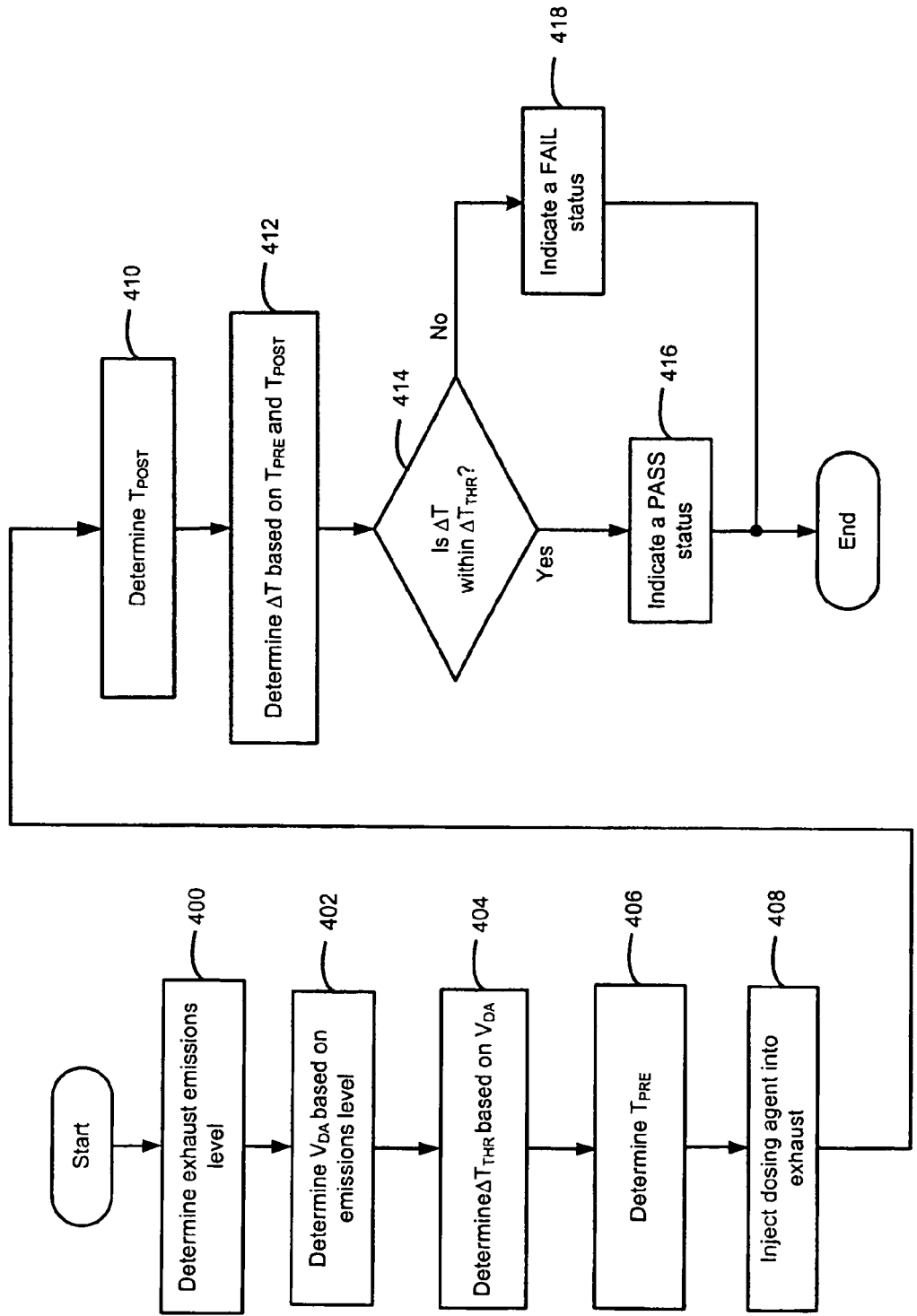
FIG. 4 is a flowchart illustrating steps executed by a non-intrusive exhaust treatment diagnostic according to the present invention.

Referring now to FIG. 4, a flowchart illustrates steps executed by the exhaust treatment diagnostic control in the non-intrusive mode. Control determines an emissions level of the exhaust in step 400. In step 402, control determines $V_{DA}$ based on the emissions level. It is anticipated that $V_{DA}$ can be determined from a look-up table based on the emissions level or can be calculated from an equation based on the emissions level. Control determines $\Delta T_{THR}$ based on $V_{DA}$ in step 404. In step 406, control determines $T_{PRE}$. Control injects $V_{DA}$ into the exhaust in step 408. In step 410, control determines $T_{POST}$. Control determines $\Delta T$ based on $T_{PRE}$ and $T_{POST}$ in step 412. In step 414, control determines whether $\Delta T$ is within $\Delta T_{THR}$. If $\Delta T$ is within $\Delta T_{THR}$, control indicates a PASS status in step 416 and control ends. If $\Delta T$ is outside $\Delta T_{THR}$, control indicates a FAIL status in step 418 and control ends.

Figure 5:
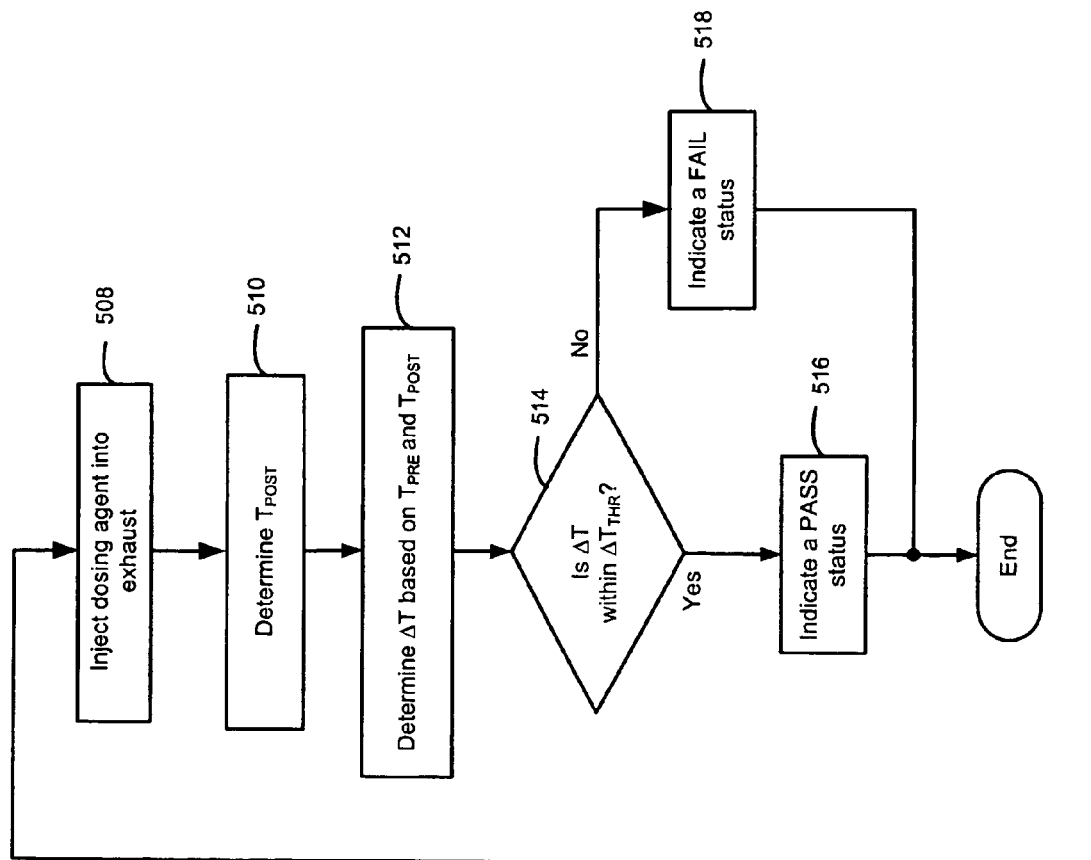
FIG. 5 is a flow chart illustrating steps of the exhaust treatment system during steady-state operation of the vehicle according to the present invention.
Figure 5:
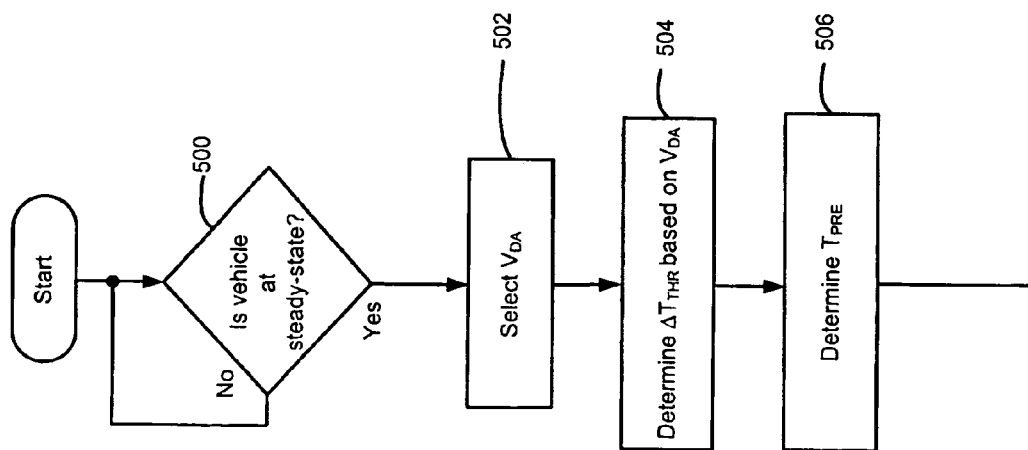

Referring now to FIG. 5, a flowchart illustrates steps executed by the exhaust treatment diagnostic control in the intrusive mode. In step 500, control determines whether the engine 12 is operating at a steady-state. In step 502, control selects $V_{DA}$ Control determines $\Delta T_{THR}$ based on $V_{DA}$ in step 504. In step 506, control determines $T_{PRE}$. Control injects the dosing agent into the exhaust in step 508. In step 510, control determines $T_{POST}$. Control determines $\Delta T$ based on $T_{PRE}$ and $T_{POST}$ in step 512. In step 514, control determines whether $\Delta T$ is within $\Delta T_{THR}$. If $\Delta T$ is within $\Delta T_{THR}$, control indicates a PASS status in step 516 and control ends. If $\Delta T$ is outside $\Delta T_{THR}$, control indicates a FAIL status in step 518 and control ends.

Control determines whether the dosing system is faulty based on the FAIL status. This can be achieved in a number of manners. For example, control can indicate a faulty dosing system based on a single FAIL status. Alternatively, control can count the number of FAILS and indicate a faulty dosing system when the number of FAILS exceeds a predetermined threshold. As another alternative, control can perform a predetermined number of diagnostic tests and indicate a faulty dosing system if the number of FAILS account for a threshold percentage of the number of diagnostic tests (e.g., 6 FAILS out of 10 diagnostic tests). In still another alternative, specific to the intrusive mode, a multiple diagnostic tests can be run using various $V_{DA}$'S (e.g., high amount, medium amount and low amount). The operational status of the dosing system can be determined based on the number of FAILS for the various diagnostic tests.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An exhaust treatment system for treating exhaust exiting an engine, comprising:
   a catalyst that receives said exhaust exiting the engine;
   a dosing system that selectively injects a dosing agent into said exhaust;
   a downstream sensor located downstream from said dosing agent and upstream from said catalyst that monitors a downstream temperature of said exhaust;
   an upstream sensor located upstream from said dosing agent and upstream from said catalyst that monitors an upstream temperature of said exhaust; and
   a control module that determines a temperature differential threshold based on an injected amount of said dosing agent, that calculates a temperature differential of said exhaust based on said downstream temperature and said upstream temperature and that evaluates operation of said dosing system based on said temperature differential and said temperature differential threshold.

2. The exhaust treatment system of claim 1 further comprising a NOx sensor that monitors a NOx level of said exhaust, wherein said amount of said dosing agent is determined based on said NOx level.

3. The exhaust treatment system of claim 2 wherein said control modules determines whether said engine is operating in steady-state, wherein said dosing agent is injected when said engine is operating in a steady-state.

4. The exhaust treatment system of claim 1 wherein said temperature differential threshold is a threshold range defined by an upper temperature differential and a lower temperature differential.

5. The exhaust treatment system of claim 4 wherein said control module indicates a PASS status of said dosing system when said temperature differential is within said threshold range and indicates a FAIL status of said dosing system when said temperature differential is outside said threshold range.

6. A method of monitoring operation of a dosing system for treating exhaust of an engine, comprising:
    monitoring a pre-ignition temperature of said exhaust upstream of said dosing system and a catalys;
    monitoring a post-ignition temperature of said exhaust downstream of said dosing system and upstream from said catalyst;
    injecting a dosing agent in to said exhaust;
    determining a temperature differential threshold based on an injected amount of said dosing agent;
    calculating a temperature differential of said exhaust based on said post-ignition temperature and said pre-ignition temperature; and
    evaluating operation of said dosing system based on said temperature differential and said temperature differential threshold.

7. The method of claim 6 further comprising:
    monitoring a NOx level of said exhaust; and
    wherein said amount of said dosing agent is determined based on said NOx level.

8. The method of claim 7 further comprising:
    determining whether said engine is operating in steady-state; and
    wherein said dosing agent is injected when said engine is operating in a steady-state.

9. The method of claim 6 wherein said temperature differential threshold is a threshold range defined by an upper temperature differential and a lower temperature differential.

10. The method of claim 9 further comprising:
    indicating a PASS status of said dosing system when said temperature differential is within said threshold range; and
    indicating a FAIL status of said dosing system when said temperature differential is outside said threshold range.

11. A method of monitoring operation of a dosing system for treating exhaust of an engine system including a catalyst, comprising:
    monitoring an upstream temperature of said exhaust upstream of said dosing system and upstream of said catalyst;
    monitoring a downstream temperature of said exhaust downstream of said dosing system and upstream of said catalyst;
    injecting a dosing agent in to said exhaust;
    determining a temperature differential threshold based on an injected amount of said dosing agent;
    calculating a temperature differential of said exhaust based on said downstream temperature and said upstream temperature;
    generating one of a PASS status and a FAIL status based on said temperature differential and said temperature differential threshold; and
    determining whether said dosing system is faulty based on said PASS status and said FAIL status.

12. The method of claim 11 further comprising:
    monitoring a NOx level of said exhaust; and
    wherein said amount of said dosing agent is determined based on said NOx level.

13. The method of claim 12 further comprising:
    determining whether said engine is operating in steady-state; and
    wherein said dosing agent is injected when said engine is operating in a steady-state.

14. The method of claim 11 wherein said temperature differential threshold is a threshold range defined by an upper temperature differential and a lower temperature differential.

15. The method of claim 14 further comprising:
    indicating said PASS status of said dosing system when said temperature differential is within said threshold range; and
    indicating said FAIL status of said dosing system when said temperature differential is outside said threshold range.

* * * * *